United States Patent
Zhang et al.

(10) Patent No.: US 9,267,433 B2
(45) Date of Patent: Feb. 23, 2016

(54) SYSTEM AND METHOD FOR TURBINE COMBUSTOR FUEL ASSEMBLY

(75) Inventors: Hua Zhang, Greer, SC (US); Douglas Frank Beadie, Greer, SC (US); Geoffrey David Myers, Simpsonville, SC (US); Fabien Thibault Codron, Simpsonville, SC (US); William Thomas Ross, Fairfield, OH (US)

(73) Assignee: General Electric Company, Schenectady, NY (US)

( * ) Notice: Subject to any disclaimer, the term of this patent is extended or adjusted under 35 U.S.C. 154(b) by 727 days.

(21) Appl. No.: 13/280,237

(22) Filed: Oct. 24, 2011

(65) Prior Publication Data

US 2013/0098056 A1    Apr. 25, 2013

(51) Int. Cl.
F02C 3/30    (2006.01)

(52) U.S. Cl.
CPC .............. F02C 3/305 (2013.01); *Y02E 20/16* (2013.01); *Y02T 50/671* (2013.01)

(58) Field of Classification Search
CPC .............. F23K 5/12; F02C 3/20; F02C 3/30; F02C 3/305; F02C 7/22; F02C 9/40
USPC .................. 60/734, 775, 39.26, 39.3, 39.461, 60/39.463, 39.48, 39.53, 39.59
See application file for complete search history.

(56) References Cited

U.S. PATENT DOCUMENTS

| | | | |
|---|---|---|---|
| 4,418,543 A | 12/1983 | Faucher et al. | |
| 4,798,330 A | 1/1989 | Mancini et al. | |
| 4,993,918 A | 2/1991 | Myers et al. | |
| 5,175,994 A * | 1/1993 | Fox et al. | 60/39.58 |
| 5,240,741 A | 8/1993 | Edwards, III et al. | |
| 5,298,091 A | 3/1994 | Edwards, III et al. | |
| 5,307,619 A * | 5/1994 | McCarty et al. | 60/775 |
| 5,324,544 A | 6/1994 | Spence et al. | |
| 5,448,890 A | 9/1995 | Coughlan, III et al. | |
| 5,809,771 A | 9/1998 | Wernberg | |
| 6,092,363 A * | 7/2000 | Ryan | 60/39.463 |
| 6,125,624 A | 10/2000 | Prociw | |
| 6,145,294 A | 11/2000 | Traver et al. | |
| 6,250,065 B1 | 6/2001 | Mandai et al. | |
| 6,289,666 B1 | 9/2001 | Ginter | |
| 6,315,815 B1 | 11/2001 | Spadaccini et al. | |
| 6,367,239 B1 * | 4/2002 | Brown et al. | 60/775 |

(Continued)

FOREIGN PATENT DOCUMENTS

| CN | 1299435 A | 6/2001 |
|---|---|---|
| CN | 201103885 Y | 8/2008 |

OTHER PUBLICATIONS

U.S. Appl. No. 13/280,200, filed Oct. 24, 2011, Hua Zhang.

(Continued)

*Primary Examiner* — Arun Goyal
(74) *Attorney, Agent, or Firm* — Fletcher Yoder, P.C.

(57) ABSTRACT

A system includes a turbine fuel supply system. The turbine fuel supply system includes a first turbine fuel mixer configured to mix a first liquid fuel and a first deaerated water to generate a first fuel mixture. The first fuel mixture is configured to combust in a combustor of a gas turbine engine. The turbine fuel supply system also includes a deaerated water flow path configured to route the first deaerated water to the first turbine fuel mixer and a liquid fuel flow path configured to route the first liquid fuel to the first turbine fuel mixer.

20 Claims, 3 Drawing Sheets

(56) References Cited

U.S. PATENT DOCUMENTS

| | | | |
|---|---|---|---|
| 6,397,602 | B2 | 6/2002 | Vandervort et al. |
| 6,427,447 | B1 | 8/2002 | Sowa |
| 6,438,938 | B1 | 8/2002 | Burkholder et al. |
| 6,457,316 | B1 | 10/2002 | Czachor et al. |
| 6,564,556 | B2 * | 5/2003 | Ginter ............................. 60/775 |
| 6,598,383 | B1 | 7/2003 | Vandervort et al. |
| 6,668,541 | B2 | 12/2003 | Rice et al. |
| 6,712,080 | B1 | 3/2004 | Handschuh et al. |
| 6,848,260 | B2 | 2/2005 | North et al. |
| 6,886,324 | B1 | 5/2005 | Handshuh et al. |
| 6,915,638 | B2 | 7/2005 | Runkle et al. |
| 6,918,255 | B2 | 7/2005 | Kaplan et al. |
| 6,931,853 | B2 | 8/2005 | Dawson |
| 6,935,116 | B2 | 8/2005 | Stuttaford et al. |
| 6,986,254 | B2 | 1/2006 | Stuttaford et al. |
| 7,007,476 | B2 | 3/2006 | Mains et al. |
| 7,104,070 | B2 | 9/2006 | Iasillo et al. |
| 7,117,675 | B2 | 10/2006 | Kaplan et al. |
| 7,137,242 | B2 | 11/2006 | Griffiths |
| 7,137,256 | B1 | 11/2006 | Stuttaford et al. |
| 7,640,724 | B2 | 1/2010 | Bellows et al. |
| 7,690,184 | B2 | 4/2010 | Gauthier et al. |
| 8,192,688 | B2 * | 6/2012 | Hagen et al. ................... 422/129 |
| 8,397,509 | B2 * | 3/2013 | Hwang ............................. 60/723 |
| 2009/0165435 | A1 | 7/2009 | Koranek |
| 2010/0058770 | A1 | 3/2010 | Ryan |

OTHER PUBLICATIONS

U.S. Appl. No. 13/280,216, filed Oct. 24, 2011, Hua Zhang.
U.S. Appl. No. 13/280,265, filed Oct. 24, 2011, Hua Zhang.
Pashley, R., "Effect of Degassing on the Formation and Stability of Surfactant-Free Emulsions and Fine Teflon Dispersions," J. Phys. Chem. B 2003, 107, 1714-1720.
Unofficial English translation of Chinese Office Action issued in connection with corresponding CN Application No. 201210410484.8 on Jul. 30, 2015.

* cited by examiner

SYSTEM AND METHOD FOR TURBINE COMBUSTOR FUEL ASSEMBLY

BACKGROUND OF THE INVENTION

The subject matter disclosed herein relates to combustion systems, and, more particularly, to supplying liquid fuel to gas turbine engines.

Various combustion systems include combustion chambers in which fuel and air combust to generate hot gases. For example, a gas turbine engine may include one or more combustion chambers that receive compressed air from a compressor, inject fuel into the compressed air, and generate hot combustion gases to drive the turbine engine. Each combustion chamber may be supplied with one or more different fuels, such as gaseous fuels and liquid fuels. Certain materials may be mixed with the fuel to affect combustion efficiency and/or production of by-products, for example. Unfortunately, some materials may not mix readily with the fuel, thereby decreasing performance of the gas turbine engine.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a turbine fuel supply system. The turbine fuel supply system includes a first turbine fuel mixer configured to mix a first liquid fuel and a first deaerated water to generate a first fuel mixture. The first fuel mixture is configured to combust in a combustor of a gas turbine engine. The turbine fuel supply system also includes a deaerated water flow path configured to route the first deaerated water to the first turbine fuel mixer and a liquid fuel flow path configured to route the first liquid fuel to the first turbine fuel mixer.

In a second embodiment, a system includes a byproduct sensor configured to transmit an input signal indicative of a sensed byproduct concentration in an exhaust from a gas turbine engine. The system also includes a byproduct controller configured to receive the input signal from the byproduct sensor and transmit an output signal to at least one control element to adjust a fuel-water ratio in a mixture of a liquid fuel and a deaerated water if the sensed byproduct concentration is above a threshold level. The control element is responsive to the output signal. The mixture of the liquid fuel and the deaerated water is configured to combust in a combustor of a gas turbine engine.

In a third embodiment, a method includes supplying a liquid fuel to a mixer, supplying a deaerated water to the mixer, mixing the liquid fuel with the deaerated water using the mixer to generate a mixture of the liquid fuel and the deaerated water, and supplying the mixture of the liquid fuel and the deaerated water to a combustor of a gas turbine engine.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
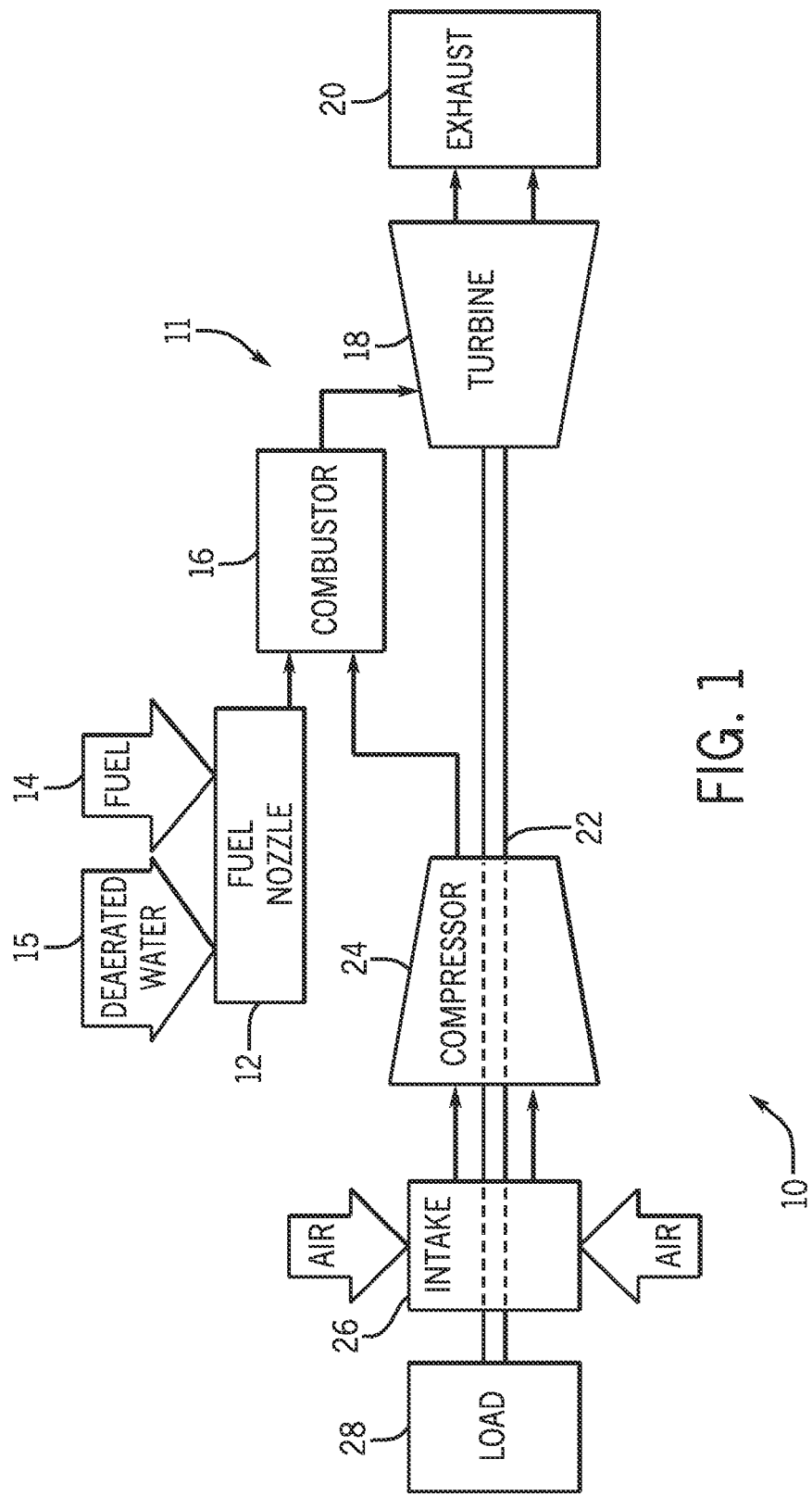
FIG. 1 is a block diagram of an embodiment of a turbine system having a combustor.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, certain embodiments provide systems and methods for supplying a fuel to a turbine combustor. For example, the turbine combustor may be a gas turbine combustor disposed in a gas turbine engine. The gas turbine combustor may also combust a liquid fuel, such as diesel fuel. For example, the gas turbine combustor may primarily combust a gaseous fuel, such as natural gas, and combust the liquid fuel when the gaseous fuel is unavailable. Thus, even if a supply of gaseous fuel is interrupted, operation of the turbine combustor may continue. However, use of gaseous fuel may be preferable, as combustion of the liquid fuel may be less efficient than combustion of the gaseous fuel and combustion of the liquid fuel may generate more byproducts (such as nitrogen oxides [$NO_x$], sulfur oxides [$SO_x$], carbon monoxide [CO], particulate matter, and so forth) in an exhaust from the gas turbine engine than combustion of the gaseous fuel. In further embodiments, the liquid fuel may be in the form of a slurry.

When liquid fuel is used in the gas turbine combustor, water may be mixed with the liquid fuel prior to introduction into the gas turbine combustor to help improve the combustion efficiency and/or to reduce byproduct (e.g., $NO_x$, $SO_x$, CO, or particulate matter) production. The added water may aid in cooling the reaction zone in the gas turbine combustor, which reduces byproduct production. Specifically, the water turns into steam in the reaction zone, which helps to reduce the temperature of the reaction zone. In certain embodiments, a mixer may mix the water and liquid fuel together. In addition, in various embodiments, the water may be deaerated water, which may be defined as water from which air and/or other dissolved gases have been removed. As described in detail below, mixtures of deaerated water and liquid fuel may produce longer-lasting emulsions compared to mixtures of non-deaerated water and liquid fuel. In other words, a mixture of deaerated water and liquid fuel may remain mixed for a longer period of time before separating compared to a mixture of non-deaerated water and liquid fuel.

Further, mixing deaerated water with the liquid fuel prior to introduction to the gas turbine combustor may offer other advantages, such as improving combustion efficiency or reducing byproduct production, for example. In certain embodiments, the temperature of the deaerated water may be greater than the temperature of the liquid fuel. Thus, the temperature of the mixture of deaerated water and liquid fuel may be greater than the temperature of the liquid fuel alone. For example, the deaerated water may be between approximately 100 degrees Celsius to 175 degrees Celsius, or 125 degrees Celsius to 150 degrees Celsius. The liquid fuel may be at an ambient temperature, which may be less than approximately 60 degrees Celsius. When the deaerated water is mixed with the liquid fuel, the temperature of the resulting mixture may be between approximately 75 degrees Celsius to 150 degrees Celsius, or 100 degrees Celsius to 125 degrees Celsius. Thus, by mixing the liquid fuel with the deaerated water, the liquid fuel (e.g., mixture) may be heated to improve combustion without a separate fuel heater. In addition, increasing the temperature of the mixture of deaerated water and liquid fuel may cause a decrease in the viscosity of the mixture. Decreasing the viscosity and increasing the temperature of the feed to the gas turbine combustor may help improve combustion efficiency. For example, at lower viscosities and higher temperatures, the feed in the gas turbine combustor may atomize better, thereby improving combustion efficiency and reducing byproduct (e.g., $NO_x$, $SO_x$, CO, or particulate matter) production.

In certain embodiments, a byproduct (e.g., $NO_x$, $SO_x$, CO, or particulate matter) sensor may be located in the gas turbine engine and may sense a byproduct concentration of the exhaust from the gas turbine engine. In further embodiments, the byproduct sensor may send signals indicative of the sensed byproduct concentration to a byproduct controller, which may then send signals to one or more control elements to adjust a ratio of the liquid fuel to deaerated water if the sensed level of the byproduct concentration of the exhaust is above a threshold level of the byproduct concentration. For example, if the sensed level of the byproduct concentration of the exhaust is above the threshold level of the byproduct concentration, the byproduct controller may send a signal to the control elements to decrease the ratio of liquid fuel to deaerated water. One of the control elements may be a control valve that decreases a flow rate of the liquid fuel and another control element may be a control valve that increases a flow rate of the deaerated water. Similarly, if the sensed level of the byproduct concentration of the exhaust is below the threshold level of the byproduct concentration, the byproduct controller may send a signal to the control elements to increase the ratio of liquid fuel to deaerated water.

Turning now to the drawings and referring first to FIG. 1, a block diagram of an embodiment of a turbine system 10 having a gas turbine engine 11 is illustrated. The turbine system 10 may use liquid or gaseous fuel, such as natural gas and/or a synthetic gas, to drive the turbine system 10. As depicted, one or more fuel nozzles 12 intake a fuel supply 14. For example, one or more fuel nozzles 12 may be used to intake liquid fuel and one or more other fuel nozzles 12 may be used to intake gaseous fuel. In addition, the fuel nozzles 12 may intake a deaerated water supply 15 when the turbine system 10 uses liquid fuel. As described in detail below, the disclosed turbine system 10 mixes the liquid fuel with the deaerated water supply 15 upstream from and/or within the fuel nozzles 12. Mixing the liquid fuel with the deaerated water 15 may improve the combustion efficiency of the gas turbine engine 11 and/or reduce production of byproducts (e.g., $NO_x$, $SO_x$, CO, or particulate matter) from the gas turbine engine 11. The fuel nozzles 12 then partially mix the fuel, or the fuel-water mixture, with air, and distribute the fuel, water (when used), and air mixture into a combustor 16 where further mixing occurs between the fuel, water (when used), and air. Although shown schematically as being outside or separate from the combustor 16, the fuel nozzles 12 may be disposed inside the combustor 16. The fuel, water (when used), and air mixture combusts in a chamber within the combustor 16, thereby creating hot pressurized exhaust gases. The combustor 16 directs the exhaust gases through a turbine 18 toward an exhaust outlet 20. Although only one combustor 16 is shown in FIG. 1, in certain embodiments, a plurality of combustors 16 may be arranged circumferentially about the gas turbine engine 11. Each of the plurality of combustors 16 may include separate fuel nozzles 12. As the exhaust gases pass through the turbine 18, the gases force turbine blades to rotate a shaft 22 along an axis of the turbine system 10. As illustrated, the shaft 22 is connected to various components of the turbine system 10, including a compressor 24. The compressor 24 also includes blades coupled to the shaft 22. As the shaft 22 rotates, the blades within the compressor 24 also rotate, thereby compressing air from an air intake 26 through the compressor 24 and into the fuel nozzles 12 and/or combustor 16. The shaft 22 may also be connected to a load 28, which may be a vehicle or a stationary load, such as an electrical generator in a power plant or a propeller on an aircraft, for example. The load 28 may include any suitable device capable of being powered by the rotational output of turbine system 10.

Figure 2:
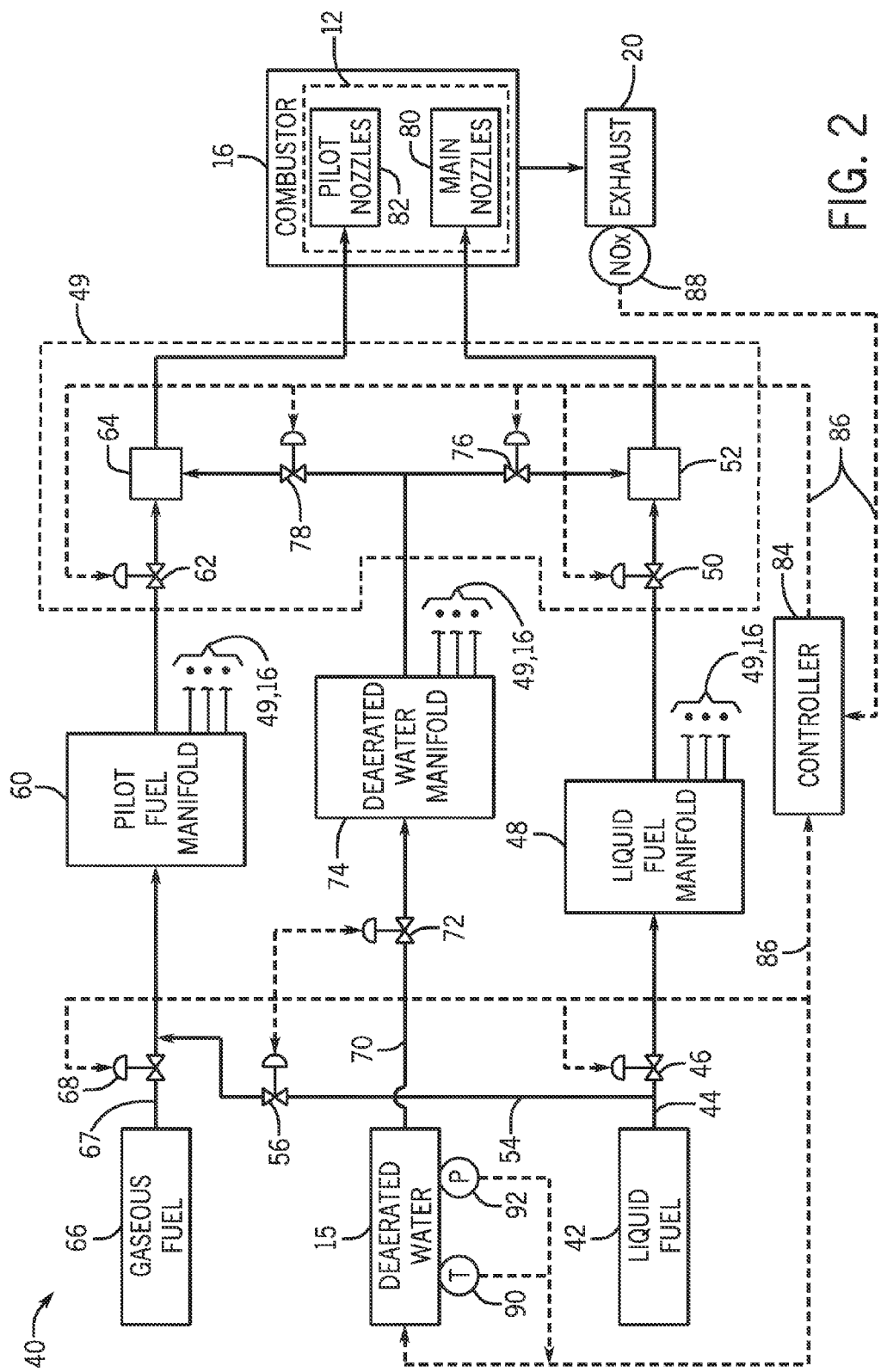
FIG. 2 is a block diagram of an embodiment of a fuel supply system for a turbine combustor.

FIG. 2 illustrates a block diagram of a turbine fuel supply system 40 of the combustor 16 of the gas turbine engine 11, as illustrated in FIG. 1. In the following discussion, the term "valve" is used to refer to any device capable of operating as a flow control. As illustrated, a liquid fuel 42 may be supplied to the combustor 16. Examples of the liquid fuel 42 include, but are not limited to, hydrocarbon based liquid fuels, such as diesel fuel, jet fuel, gasoline, naphtha, fuel oil, and so forth. The liquid fuel 42 is routed to the combustor 16 via a liquid fuel flow path 44, which may include a liquid fuel supply valve 46. The liquid fuel flow path 44 may also include a liquid fuel manifold 48, which may be used to supply the liquid fuel 42 to a plurality of mixing assemblies 49 (as indicated by ellipses), which may be, for example, arranged circumferentially about the liquid fuel manifold 48. In certain embodiments, the liquid fuel manifold 48 may be configured as a ring with a circular or polygonal shape. Each of the plurality of mixing assemblies 49 may be coupled to one of the plurality of combustors 16 arranged circumferentially about the gas turbine engine 11. The liquid fuel supply valve 46 may be used to adjust and/or isolate flow of the liquid fuel 42 to the liquid fuel manifold 48. In certain embodiments, each mixing assembly 49 may include a liquid fuel mixing valve 50, which may be used to adjust a flow rate of the liquid fuel 42 to a liquid fuel mixer 52 disposed in each mixing assembly 49.

In certain embodiments, a portion of the liquid fuel 42 may be routed to a pilot fuel flow path 54, which may include a pilot fuel supply valve 56. The pilot fuel flow path 54 may be used when first starting the combustor 16 with the liquid fuel 42. For example, the pilot fuel flow path 54 may flow a lower flow rate of the liquid fuel 42 than the liquid fuel flow path 44. In certain embodiments, the flow rate of the liquid fuel 42 through the pilot fuel flow path 54 may be between approximately 5 percent to 50 percent, 10 percent to 35 percent, or 15 percent to 25 percent of a normal, or regular, flow rate. A low flow rate of the liquid fuel 42, which may be referred to as pilot fuel, may be used to first start the combustor 16. Afterwards, the liquid fuel flow path 44 may be used to supply the normal, or regular, flow rate of the liquid fuel 42 to the combustor 16. During startup of the combustor 16, the liquid fuel 42 from the pilot fuel supply valve 56 may be routed to a pilot fuel manifold 60, which may be used to supply the pilot fuel to the plurality of mixing assemblies 49 (as indicated by ellipses). In certain embodiments, the pilot fuel manifold 60 may be configured as a ring with a circular or polygonal shape. The pilot fuel supply valve 56 may be used to adjust and/or isolate flow of the liquid fuel 42 to the pilot fuel manifold 60. In certain embodiments, the mixing assembly 49 may include a pilot fuel mixing valve 62, which may be used to adjust a flow rate of the liquid fuel 42 to a pilot fuel mixer 64 disposed in the mixing assembly 49. After startup of the combustor 16, the pilot fuel flow path 54 may no longer be used to supply the liquid fuel 42 to the combustor 16. Instead, a gaseous fuel 66 may be supplied to the pilot fuel manifold 60 via a gaseous fuel flow path 67, thereby purging the liquid fuel 42 from the pilot fuel manifold 60 with the gaseous fuel 66. Examples of the gaseous fuel 66 include, but are not limited to, methane, natural gas, syngas, and so forth. The gaseous fuel flow path 67 may include a gaseous fuel supply valve 68, which may be used to adjust and/or isolate flow of the gaseous fuel 66. Purging the pilot fuel flow path 54 with the gaseous fuel 66 may help prevent the liquid fuel 42 from coking or oxidizing in the pilot fuel flow path 54 when not in use. In other embodiments, other gases, such as nitrogen, carbon dioxide, steam, and so forth, may be used to purge the pilot fuel flow path 54 when not in use.

The deaerated water 15 may be supplied to the combustor 16 via a deaerated water flow path 70, which may include a deaerated water supply valve 72. Deaerated water may be generated by contacting water with steam to strip, or remove, dissolved gases from the water. The solubility of dissolved gases generally decreases at higher temperatures, so the high temperature of the steam helps to drive off the dissolved gases. For example, in a tray-type, or cascade-type, deaerator, water flows downward through perforations formed one or more perforated trays and steam flows upward through the perforations. In a spray-type deaerator, water is sprayed downward into rising steam. In both types of deaerators, the steam carries away the dissolved gases from the water to generate the deaerated water. Another method of generating the deaerated water 15 is vacuum degasification, in which water is placed under a reduced pressure (e.g., a vacuum) to reduce the solubility of the dissolved gases. Other methods of deaeration, such as membrane degasification, may also be used to generate the deaerated water 14. The deaerated water may include between approximately 5 parts per billion (ppb) by weight to 10 ppb by weight, 3 ppb by weight to 25 ppb by weight, or 1 ppb by weight to 50 ppb by weight of dissolved gases (e.g., oxygen or carbon dioxide). One example of deaerated water 15 is boiler feedwater, which may be supplied by a water treatment system and used to supply a boiler to generate steam or hot water. The boiler feedwater may be treated by the water treatment system to help prevent corrosion and fouling in the boiler. Another source of the deaerated water 15 is a heat recovery steam generator, as discussed in detail below.

The deaerated water supply valve 72 in the deaerated water flow path 70 may be used to adjust and/or isolate a flow of the deaerated water 15 to a deaerated water manifold 74, which may be used to supply the deaerated water 15 to the plurality of mixing assemblies 49 (as indicated by ellipses). In certain embodiments, the deaerated water manifold 74 may be configured as a ring with a circular or polygonal shape. As shown in FIG. 2, the deaerated water 15 is supplied to the liquid fuel mixer 52 and the pilot fuel mixer 64 of each of the plurality of mixing assemblies 49. In addition, the mixing assembly 49 may include a deaerated water liquid fuel mixing valve 76 and a deaerated water pilot fuel mixing valve 78. The deaerated water liquid fuel mixing valve 76 and the deaerated water pilot fuel mixing valve 78 may adjust a flow of the deaerated water 15 to the liquid fuel mixer 52 and the pilot fuel mixer 64, respectively. The liquid fuel and pilot fuel mixers 52 and 64 may mix the liquid fuel 42 with the deaerated water 15 to form an emulsion, which may be defined as a mixture of two of more immiscible liquids. Examples of the liquid fuel and pilot fuel mixers 52 and 64 include, but are not limited to, mixing tees, in-line mixers, static mixers, paddle mixers, blenders, ribbon blenders, and so forth. For example, a mixing tee may include two pipes, or lines, coming together at a tee.

Mixtures of the deaerated water 15 and the liquid fuel 42 form improved emulsions compared to mixtures of non-deaerated water and the liquid fuel 42 for several reasons. When two immiscible liquids are mixed, droplets of one liquid will be dispersed throughout the other liquid. For example, when a hydrocarbon liquid is mixed with water, droplets of the hydrocarbon liquid will initially be dispersed throughout the water. However, the droplets of the hydrocarbon are hydrophobic and will eventually coalesce to form a hydrocarbon phase separate from a water phase. Removal of dissolved gases from water to form deaerated water may enhance the ability of the hydrocarbon droplets to break away, or detach, from the hydrocarbon phase when mechanically disturbed. For example, the liquid fuel mixer 52 or the pilot fuel mixer 64 may be used to mechanically disturb the mixture of the deaerated water 15 and the liquid fuel 42, e.g., a hydrocarbon based liquid fuel, to form a stable emulsion. Additionally, removal of dissolved gases from water may aid in the detachment of hydrocarbon droplets that would otherwise coalesce to form the hydrocarbon phase. In other words, the hydrophobic attraction of droplets of the liquid fuel 42 to one another in the deaerated water 15 may be reduced, thereby enhancing detachment of the droplets of the liquid fuel 42 and emulsion formation. Such emulsions of the deaerated water 15 and the liquid fuel 42 may be stable for extended periods, for example, up to several days or longer. Thus, the mixture of the deaerated water 15 and the liquid fuel 42 may be expected to remain an emulsion, without separation, downstream of the liquid fuel mixer 52 and the pilot fuel mixer 64. Additionally, the mixture of the deaerated water 15 and the liquid fuel 42 may be stored for certain periods without separation. Further, emulsions of the deaerated water 15 and the liquid fuel 42 may be formed using only simple mechanical mixing, as with the liquid fuel mixer 52 or the pilot fuel mixer 64, without use of any additional additives, such as surfactants or polymer stabilizers. In such emulsions, the liquid fuel 42 may be more uniformly distributed in the deaerated water 15 compared to mixtures of the liquid fuel and water that is not deaerated. For example, sizes of the droplets of the liquid fuel 42 may be less than approximately 20 micrometers, 15 micrometers, 10 micrometers, 5 micrometers, or 1 micrometer.

Returning to FIG. 2, the emulsion of the liquid fuel 42 and the deaerated water 15 from the liquid fuel mixer 52 is supplied to main nozzles 80 of the combustor 16. The main nozzles 80 may constitute a portion of the fuel nozzles 12 and may discharge the emulsion at high, or normal, flow rates. The emulsion of the liquid fuel 42 and the deaerated water 15 from the pilot fuel mixer 64 is supplied to pilot nozzles 82 of the combustor 16. The pilot nozzles 82 may constitute another portion of the fuel nozzles 12 and may discharge the emulsion at low, or startup, flow rates. For example, the pilot nozzles 82 may be used during startup of the combustor 16, after which the main nozzles 80 are used. Accordingly, the pilot nozzles 82 may be smaller than the main nozzles 80. Thus, the pilot nozzles 82 may be limited to passing lower flow rates of the emulsion compared to the main nozzles 80. For example, the flow rate of the emulsion through the pilot nozzles 82 may be between approximately 5 percent to 50 percent, 10 percent to 35 percent, or 15 percent to 25 percent of a flow rate through the main nozzles 80. In some embodiments, the pilot nozzles 82 may be used together with, or at the same time as, the main nozzles 80. In addition, the combustor 16 may include additional fuel nozzles 12 to supply the gaseous fuel 66.

In certain embodiments, the turbine fuel supply system 40 may include a controller 84, which may send and/or receive various signals along signal paths 86. In the following discussion, the signals sent or received along the signal paths 86 will also be referred to by the reference numeral 86. For example, the controller 84 may send signals 86 to one or more of the liquid fuel supply valve 46, the liquid fuel mixing valve 50, the pilot fuel supply valve 56, the pilot fuel mixing valve 62, the gaseous fuel supply valve 68, the liquid fuel water mixing valve 76, and the pilot fuel water mixing valve 78 to direct the valves to adjust, open, or close. In addition, the controller 84 may receive a signal 86 from a $NO_x$ sensor 88 that senses a $NO_x$ concentration of the exhaust 20. In other embodiments, the sensor 88 may be configured to sense other parameters of the exhaust 20, such as, but not limited to, $SO_x$ concentration, CO concentration, particulate concentration, temperature, pressure, flow rate, and so forth. In certain embodiments, the controller 84 may adjust a ratio of the liquid fuel 42 to the deaerated water 15 if a sensed level of the $NO_x$ concentration from the $NO_x$ sensor 88 is above a threshold level of the $NO_x$ concentration. For example, if the $NO_x$ sensor 88 senses a $NO_x$ concentration above the threshold level of the $NO_x$ concentration, the controller 84 may send a signal 86 to the liquid fuel water mixing valve 76 and/or deaerated water pilot fuel mixing valve 78 to open more to enable additional deaerated water 15 to flow to the liquid fuel mixer 52 and/or the pilot fuel mixer 64, respectively. By increasing the flow of the deaerated water 15 to the liquid fuel mixer 52, the ratio of the liquid fuel 42 to the deaerated water 15 decreases, thereby decreasing the $NO_x$ concentration of the exhaust 20. In certain embodiments, the ratio of the liquid fuel 42 to the deaerated water 15 may be, for example, between approximately 0.5:1 to 0.7:1, 0.4:1 to 0.8:1, or 0.3:1 to 1:1. Similarly, if the $NO_x$ sensor 88 senses a $NO_x$ concentration below the threshold level of the $NO_x$ concentration, the controller 84 may send a signal 86 to the liquid fuel water mixing valve 76 and/or deaerated water pilot fuel mixing valve 78 to close partially to reduce the flow of the deaerated water 15 to the liquid fuel mixer 52 and/or the pilot fuel mixer 64, respectively.

Similarly, in other embodiments, the controller 84 may receive signals 86 from a deaerated water temperature sensor 90 and/or a deaerated water pressure sensor 92. The controller 84 may send signals 86 to the liquid fuel water mixing valve 76 or the pilot fuel water mixing valve 78 in response to signals 86 received from the deaerated water temperature sensor 90 and/or deaerated water pressure sensor 92. For example, if the temperature of the deaerated water 15 increases, the controller 84 may direct the liquid fuel water mixing valve 76 or the pilot fuel water mixing valve 78 to reduce the flow rate of deaerated water 15 to the combustor 16. Similarly, if the temperature of the deaerated water 15 decreases, the controller 84 may direct the liquid fuel water mixing valve 76 or the pilot fuel water mixing valve 78 to increase the flow rate of deaerated water 15 to the combustor 16. In certain embodiments, the controller 84 may adjust the temperature and/or pressure of the deaerated water 15 in response to signals 86 from the deaerated water temperature sensor 90 and/or deaerated water pressure sensor 92. For example, the controller 84 may send a signal 86 to the source of the deaerated water 15 to maintain the deaerated water 15 at a temperature between approximately 100 degrees Celsius to 175 degrees Celsius, or 125 degrees Celsius to 150 degrees Celsius. In other embodiments, the controller 84 may adjust the flow rate of deaerated water 15 to maintain a temperature of the emulsion by sending signals 86 to the deaerated water mixing valves 76 or 78. For example, the controller 84 may adjust the flow rate of deaerated water 15 to maintain the emulsion at a temperature between approximately 75 degrees Celsius to 150 degrees Celsius, or 100 degrees Celsius to 125 degrees Celsius.

Figure 3:
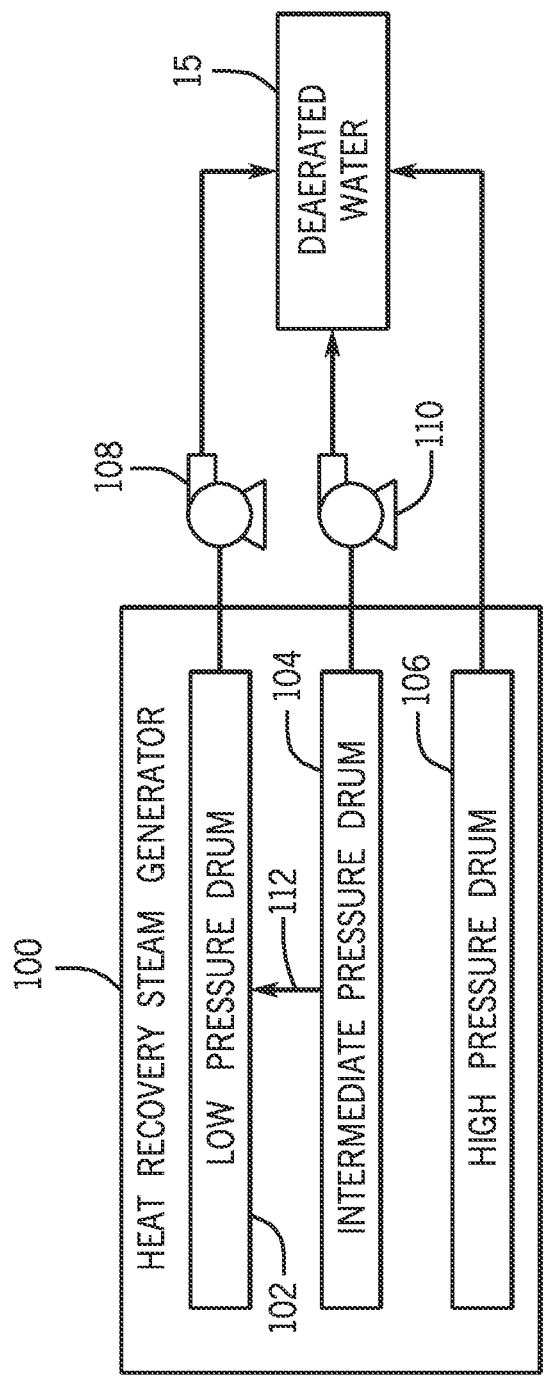
FIG. 3 is a block diagram of an embodiment of a heat recovery steam generator that supplies deaerated water.

FIG. 3 is a block diagram of a heat recovery steam generator (HRSG) 100 that may be used to supply the deaerated water 15. In a gas turbine combined cycle (GTCC) power plant, for example, heated exhaust gas from the gas turbine engine may be transported into the HRSG 100 and used to heat water to produce steam. In other embodiments, other sources of heat may be used by the HRSG 100 to produce steam. The HRSG 100 may include one or more sections arranged in different configurations. For example, in one embodiment, the HRSG 100 may include a low-pressure steam section, an intermediate-pressure steam section, and a high-pressure steam section. Accordingly, each section of the HRSG 100 may include a steam drum. In the illustrated embodiment, the HRSG 100 may include a low-pressure drum 102, an intermediate-pressure drum 104, and a high-pressure drum 106. Each of the drums 102, 104, and 106 may be used to separate steam from condensate in the respective sections of the HRSG 100. In other words, condensate may flow from the bottom of the steam drum and steam may flow from the top of the steam drum. In further embodiments, other types of heat exchangers may be used to supply the deaerated water 15. Such exchangers may be found in a variety of plants other than the GTCC power plant.

In certain embodiments, the HRSG 100 is supplied with deaerated water from a deaerating condenser to help prevent corrosion inside the HRSG 100. Examples of deaerating condensers include, but are not limited to, tray-type deaerators and spray-type deaerators. In the HRSG 100, heat from the heated exhaust gas, or any other source of heat, converts the deaerated water into steam, which forms deaerated water again when condensed and collected in the drums 102, 104, and 106. Thus, a portion of the condensate from the drums 102, 104 and 106 may be supplied to the turbine fuel supply system 40 as deaerated water 15. As certain embodiments of the HRSG 100 already include the deaerating condenser, no additional deaerator is used to supply the deaerated water 15 to the turbine fuel supply system 40. Instead, a portion of deaerated water already produced by the HRSG 100 is used to supply the deaerated water 15 to the turbine fuel supply system 40. Thus, additional equipment, costs, and complexity associated with a separate deaerator for the turbine fuel supply system 40 may be avoided by using a portion of the deaerated water from the HRSG 100 as the deaerated water 15 to the turbine fuel supply system 40. In plants other than the GTCC power plant, other heat exchangers, or similar equipment, may be available to produce the deaerated water 15 supplied to the turbine fuel supply system 40. In further embodiments, deaerators using tray-type condensers, spray-type condensers, or other techniques may be used to supply the deaerated water 15.

In certain embodiments, the liquid fuel 42 may be supplied to the combustor 16 at a high pressure to provide for efficient combustion. For example, the pressure of the liquid fuel 42 may be between approximately 8000 kilopascals (kPa) to 10000 kPa, 8400 kPa to 9600 kPa, or 8800 kPa to 9200 kPa. Accordingly, the deaerated water 15 may be supplied to the liquid fuel and pilot fuel mixers 52 and 64 at similar or higher pressures to enable the deaerated water 15 to mix properly with the liquid fuel 42. For example, a pressure of the deaerated water 15 from the high-pressure drum 106 may be between approximately 11000 kPa to 20000 kPa, 14000 kPa to 18000 kPa, or 16000 kPa to 17000 kPa. Thus, the deaerated water 15 from the high-pressure drum 106 may be supplied directly to the deaerated water manifold 74. In contrast, a pressure of the deaerated water 15 from the low-pressure drum 102 or the intermediate pressure drum 104, which may be limited by the configuration of the HRSG 100, may be less than that of the liquid fuel 42. For example, a pressure of the deaerated water 15 from the intermediate-pressure drum 104 may be between approximately 4700 kPa to 8000 kPa, 5500 kPa to 7500 kPa, or 6000 kPa to 7000 kPa. Additionally, a pressure of the deaerated water 15 from the low-pressure drum 102 may be between approximately 2000 kPa to 2760 kPa, 1400 kPa to 4120 kPa, or 680 kPa to 5600 kPa. Thus, a first booster pump 108 may be used to increase the pressure of the deaerated water 15 from the low-pressure drum 102 to a pressure closer to that of the liquid fuel 42. Similarly, a second booster pump 110 may be used to increase the pressure of the deaerated water 15 from the intermediate pressure drum 104 to a pressure closer to that of the liquid fuel 42. In certain embodiments, the pressure of the deaerated water 15 from the intermediate pressure drum 104 may be close enough to the pressure of the liquid fuel 42 to omit the second booster pump 110. In addition, in certain embodiments, if the amount of deaerated water 15 supplied by the low pressure drum 102 is insufficient or to provide additional operational flexibility, a portion 112 of the intermediate pressure condensate may be routed from the intermediate pressure drum 104 to the low-pressure drum 102, thereby omitting the second booster pump 110.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a mixing assembly, comprising:
      a first turbine fuel mixer connected to a fuel source and a deaerated water source to mix a liquid fuel from the fuel source and a first portion of a deaerated water from the deaerated water source to generate a first fuel mixture, wherein the first turbine fuel mixer is connected to route the first fuel mixture to a first portion of a combustor of a gas turbine engine to combust the first fuel mixture in the combustor of a gas turbine engine;
      a second turbine fuel mixer connected to the liquid fuel source, the deaerated water source, and a gaseous fuel source to generate a second fuel mixture, wherein the second turbine fuel mixer is connected to route the second fuel mixture to a second portion of the combustor of the gas turbine engine to combust the second fuel mixture in the combustor of the gas turbine engine;
      a deaerated water flow path to route the first portion of the deaerated water to the first turbine fuel mixer and to route a second portion of the deaerated water to the second turbine fuel mixer; and
      a first liquid fuel flow path to route the liquid fuel to the first turbine fuel mixer;
      a second liquid fuel flow path to route the liquid fuel to the second turbine fuel mixer through at least one valve; and
      a gaseous fuel flow path to route a gaseous fuel from the gaseous fuel source to the second turbine mixer through the at least one valve.

2. The system of claim 1, wherein the first turbine fuel mixer comprises at least one of a mixing tee, an in-line mixer, a static mixer, a paddle mixer, a blender, or a ribbon blender, or a combination thereof.

3. The system of claim 1, comprising a water treatment system configured to supply the first portion of the deaerated water to the first turbine fuel mixer along the deaerated water flow path.

4. The system of claim 1, comprising a heat recovery steam generator configured to supply the first portion of the deaerated water to the first turbine fuel mixer along the deaerated water flow path.

5. The system of claim 4, wherein the heat recovery steam generator is configured to generate the deaerated water.

6. The system of claim 4, comprising a booster pump configured to increase a pressure of the deaerated water from a low-pressure section or an intermediate-pressure section of the heat recovery steam generator.

7. The system of claim 1, wherein the first turbine fuel mixer is configured to mix the liquid fuel and the first portion of the deaerated water to generate a first emulsion of the liquid fuel and the first portion of the deaerated water as the first fuel mixture.

8. The system of claim 1, comprising:
   the second turbine fuel mixer configured to mix the gaseous fuel and the second portion of the deaerated water to generate the second fuel mixture, wherein the first fuel mixture is a main fuel mixture, and the second fuel mixture is a pilot fuel mixture.

9. The system of claim 1, wherein the deaerated water flow path comprises a deaerated water manifold configured to route deaerated water to a plurality of mixing assemblies of the gas turbine engine.

10. The system of claim 9, wherein each of the plurality of mixing assemblies comprises one of a plurality of the first turbine fuel mixers, one of a plurality of deaerated water mixing valves, and one of a plurality of liquid fuel mixing valves.

11. The system of claim 1, wherein the first portion of the combustor comprises a main fuel nozzle and the second portion of the combustor comprises a pilot fuel nozzle.

12. A system, comprising:
   a byproduct sensor configured to transmit an input signal indicative of a sensed byproduct concentration in an exhaust from a gas turbine engine;
   a byproduct controller configured to receive the input signal from the byproduct sensor and transmit an output signal to at least one control element, wherein the at least one control element is responsive to the output signal, to adjust a fuel-water ratio in a mixture of a liquid fuel and a deaerated water if the sensed byproduct concentration is above a threshold level, wherein the mixture of the liquid fuel and the deaerated water is configured to combust in a combustor of the gas turbine engine; and a mixing assembly coupled to the combustor, wherein the mixing assembly comprises:

a first turbine fuel mixer connected to a fuel source and a deaerated water source to mix the liquid fuel from the fuel source and a first portion of the deaerated water from the deaerated water source to generate a first fuel mixture, wherein the first turbine fuel mixer is connected to route the first fuel mixture to a first portion of the combustor of the gas turbine engine to combust the first fuel mixture in the combustor of the gas turbine engine;

a second turbine fuel mixer connected to the liquid fuel source, the deaerated water source, and a gaseous fuel source to generate a second fuel mixture, wherein the second turbine fuel mixer is connected to route the second fuel mixture to a second portion of the combustor of the gas turbine engine to combust the second fuel mixture in the combustor of the gas turbine engine;

a deaerated water flow path to route the first portion of the deaerated water to the first turbine fuel mixer and to route a second portion of the deaerated water to the second turbine fuel mixer; and a first liquid fuel flow path to route the liquid fuel to the first turbine fuel mixer;

a second liquid fuel flow path to route the liquid fuel to the second turbine fuel mixer through at least one valve; and a gaseous fuel flow path to route a gaseous fuel from the gaseous fuel source to the second turbine mixer through the at least one valve.

13. The system of claim 12, wherein the first mixer is configured to mix the liquid fuel and the first portion of the deaerated water to generate the first mixture upstream of the combustor of the gas turbine engine in response to the output signal from the byproduct controller.

14. The system of claim 13, wherein the deaerated water source is configured to supply the first portion of the deaerated water to the first mixer and adjust a pressure or temperature of the deaerated water in response to the output signal from the byproduct controller.

15. A method, comprising:

supplying a liquid fuel to a first mixer of a mixing assembly from a fuel source connected to the first mixer;

supplying deaerated water to each of the first mixer and a second mixer from a deaerated water source connected to each of the first mixer and the second mixer;

mixing the liquid fuel with the deaerated water using the first mixer to generate a first mixture of the liquid fuel and the deaerated water;

routing the liquid fuel from the fuel source connected to the second fuel mixer through at least one valve;

routing a gaseous fuel from a gaseous fuel source connected to the second turbine mixer through the at least one valve;

generating a second fuel mixture using the second mixer;

supplying the first mixture from the first mixer to a first portion of a combustor of a gas turbine engine via a first flow path connection between the first mixer and the combustor; and supplying the second mixture from the second mixer to a second portion of the combustor of the gas turbine engine via a second flow path connection between the second mixer and the combustor.

16. The method of claim 15, comprising adjusting a ratio of the liquid fuel to the deaerated water in the first mixture to control a byproduct concentration in products resulting from combustion of the first mixture.

17. The method of claim 15, comprising adjusting a temperature or a pressure of the deaerated water to control a byproduct concentration in products resulting from combustion of the first mixture.

18. The method of claim 15, wherein mixing the liquid fuel with the deaerated water comprises using the first mixer to generate an emulsion of the liquid fuel and the deaerated water.

19. The system of claim 1, comprising:

a byproduct sensor configured to transmit an input signal indicative of a sensed byproduct concentration in an exhaust from a gas turbine engine; and a byproduct controller configured to receive the input signal from the byproduct sensor and transmit an output signal to at least one control element, wherein the at least one control element is responsive to the output signal, to adjust a fuel-water ratio in the first fuel mixture if the sensed byproduct concentration is above a threshold level.

20. The method of claim 15, wherein supplying the first mixture to the first portion of the combustor of the gas turbine engine comprises supplying the first mixture to a main fuel nozzle of the combustor, wherein supplying the second mixture to the second portion of the combustor comprises supplying the second mixture to a pilot fuel nozzle of the combustor.

* * * * *